Figure 1:
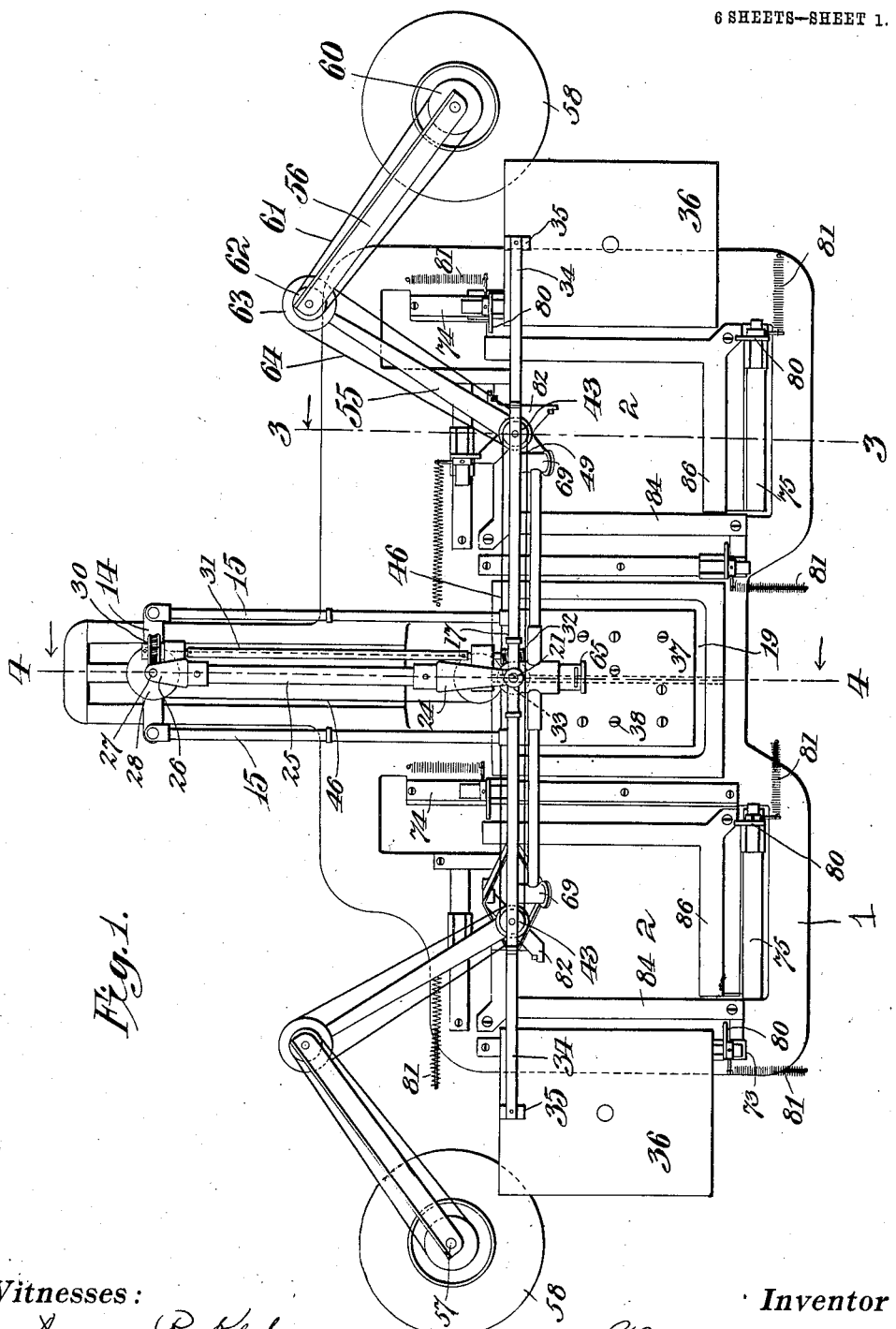

No. 847,746. PATENTED MAR. 19, 1907.
T. A. EDISON.
ELECTRICAL WELDING APPARATUS.
APPLICATION FILED JULY 21, 1904.

6 SHEETS—SHEET 1.

Witnesses:

Inventor
Thomas A Edison
by Frank L. Dyer
Attorney

No. 847,746. PATENTED MAR. 19, 1907.
T. A. EDISON.
ELECTRICAL WELDING APPARATUS.
APPLICATION FILED JULY 21, 1904.
6 SHEETS—SHEET 2.
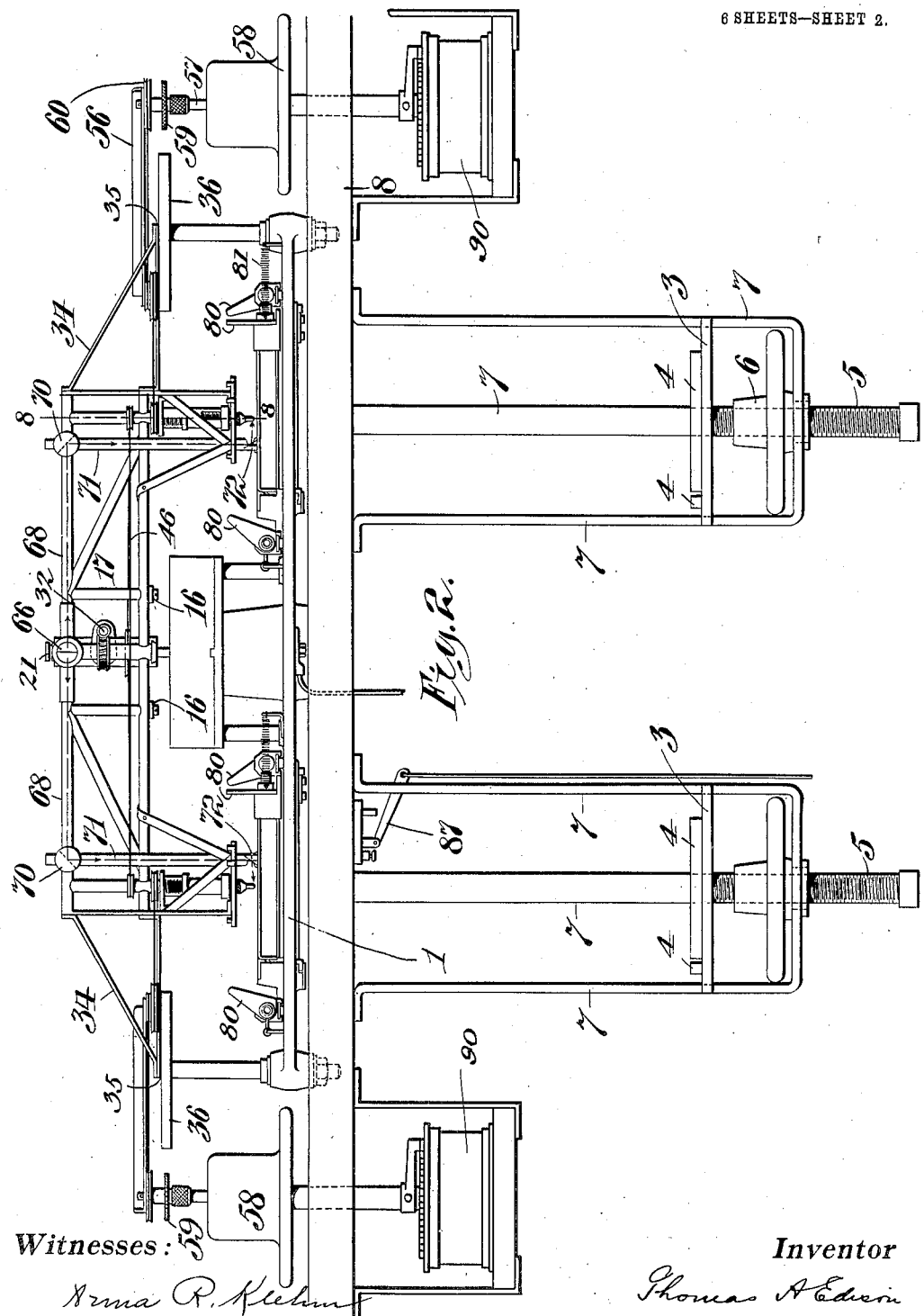
Witnesses:
Inventor
Thomas A Edison
by Frank L. Dyer
Attorney

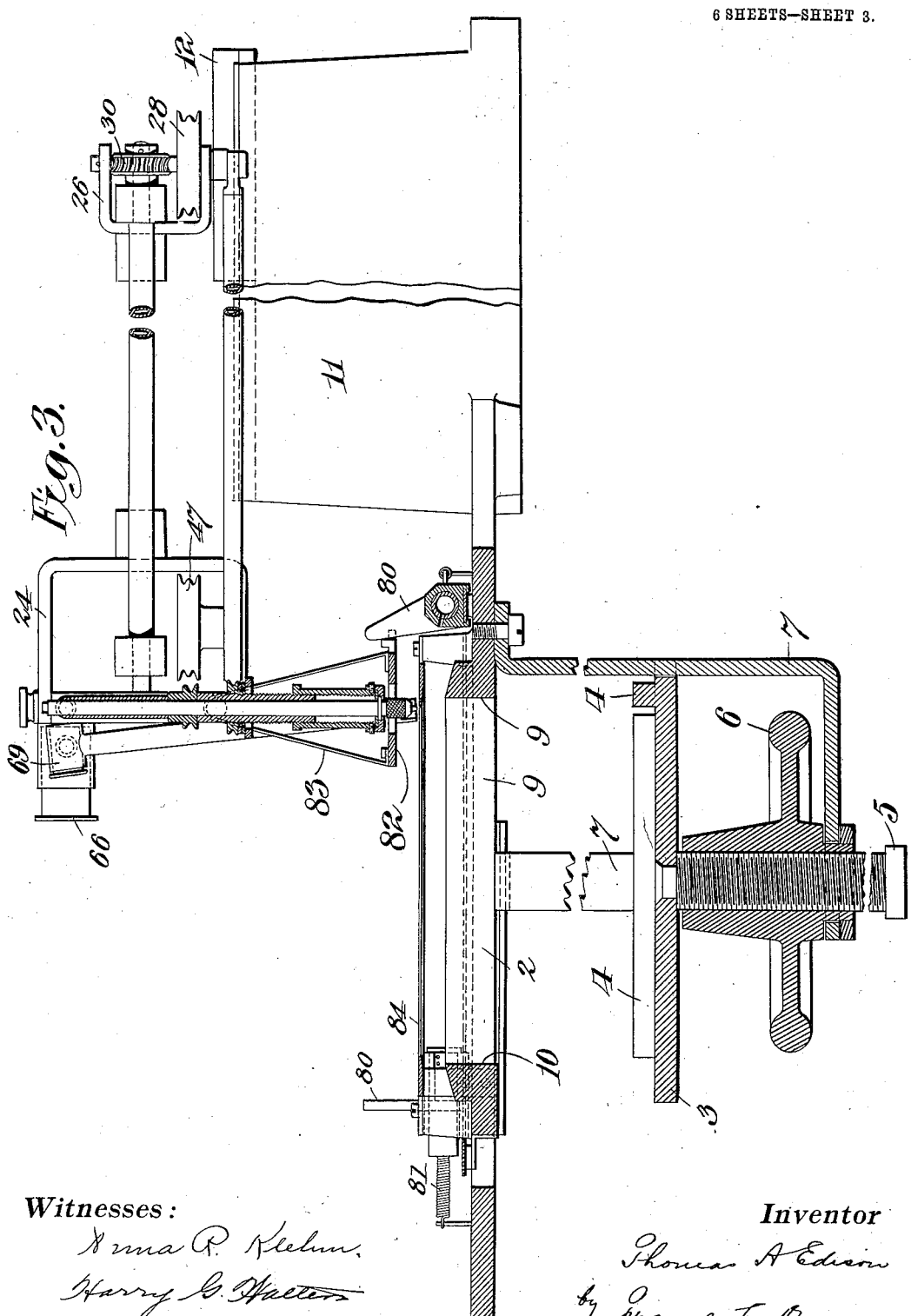

No. 847,746. PATENTED MAR. 19, 1907.
T. A. EDISON.
ELECTRICAL WELDING APPARATUS.
APPLICATION FILED JULY 21, 1904.
6 SHEETS—SHEET 4.
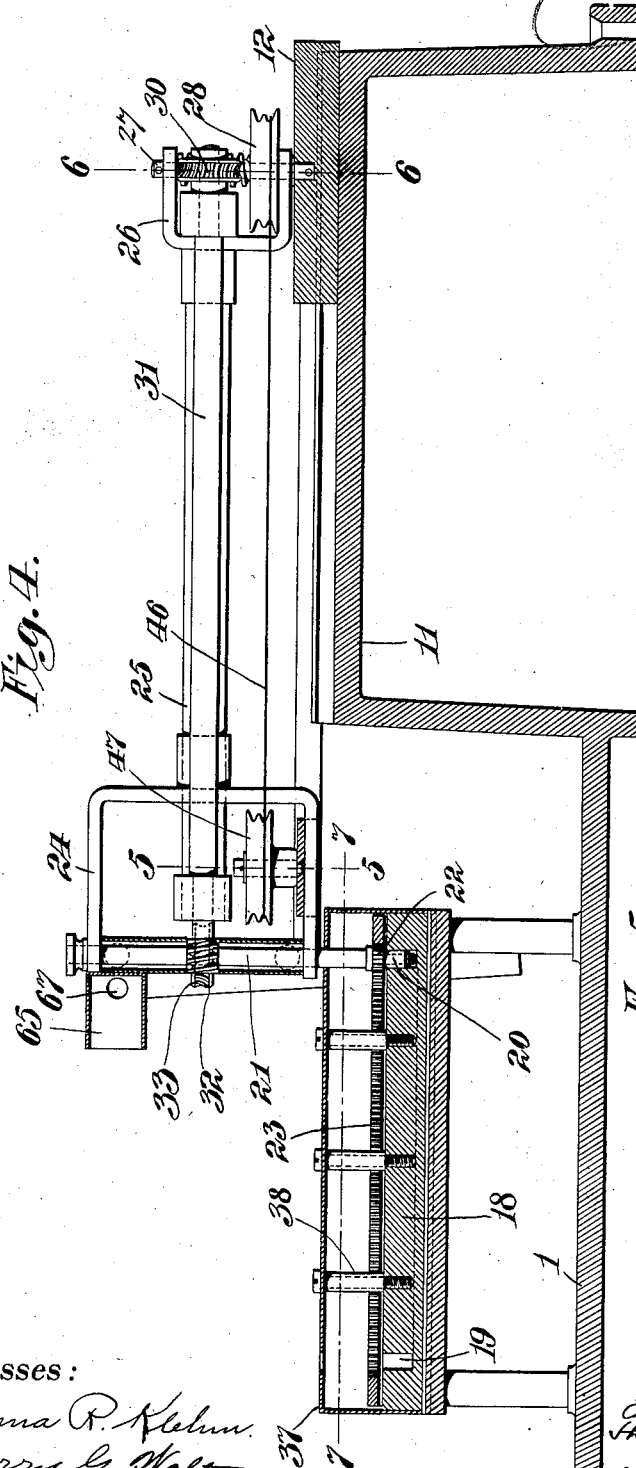
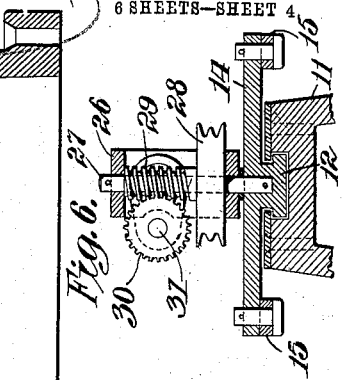
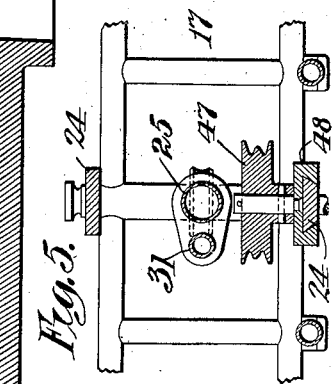
Witnesses:
Inventor
Thomas A Edison
by Frank L. Dyer
Attorney No. 847,746. PATENTED MAR. 19, 1907.
T. A. EDISON.
ELECTRICAL WELDING APPARATUS.
APPLICATION FILED JULY 21, 1904.
6 SHEETS—SHEET 5.
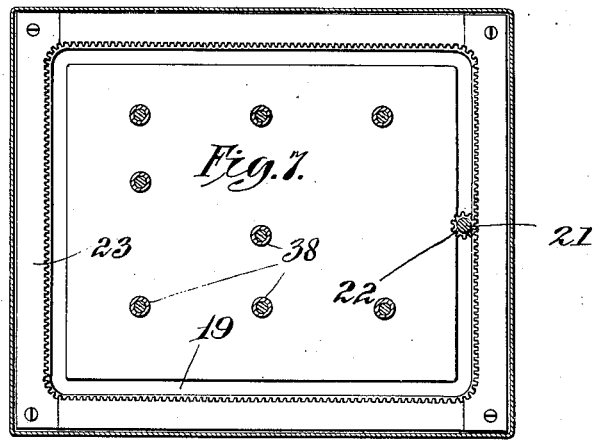
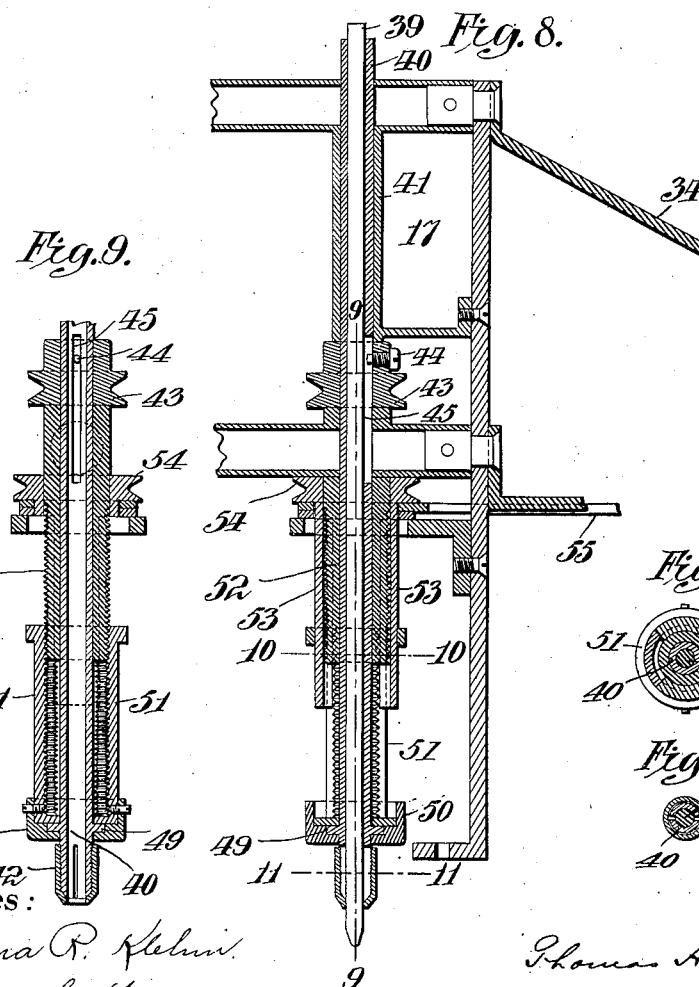
Witnesses:
Inventor
Thomas A Edison
by Frank L. Dyer
Attorney No. 847,746. PATENTED MAR. 19, 1907.
T. A. EDISON.
ELECTRICAL WELDING APPARATUS.
APPLICATION FILED JULY 21, 1904.

6 SHEETS—SHEET 6.

Witnesses:
Anna R. Klehm
Harry G. Walters

Inventor
Thomas A Edison
by Frank L. Dyer
Attorney

UNITED STATES PATENT OFFICE.

THOMAS A. EDISON, OF ORANGE, NEW JERSEY.

ELECTRICAL WELDING APPARATUS.

No. 847,746.　　　　Specification of Letters Patent.　　　　Patented March 19, 1907.

Application filed July 21, 1904. Serial No. 217,538.

*To all whom it may concern:*

Be it known that I, THOMAS A. EDISON, residing at Llewellyn Park, Orange, in the county of Essex and State of New Jersey, have invented a certain new and useful Electrical Welding Apparatus, of which the following is a description.

My invention relates to various new and useful improvements in electrical welding apparatus, and particularly to apparatus of the type in which the welding is performed by the heat of an electric arc.

The improved apparatus is adapted for use in welding together the contiguous surfaces of seams of various forms, and where the seams to be welded are reproduced in the successive articles to operated upon the improved apparatus is capable of a substantially automatic operation, the only manual attention, in fact, being the proper regulation of the arc.

Specifically, the apparatus has been designed for the purpose of welding the seam formed between the flange of the cover and the upper edge of the sheet-metal can employed by me for holding the supports, active materials, and the electrolyte of my improved storage batteries. The invention is especially suited for this purpose, because it has been found very difficult to make a solder that is absolutely unaffected by electrolysis in an alkaline solution. By welding the seam between the cover and the can an absolutely perfect joint is secured, doing away completely with the necessity for solder, and since the weld is practically superficial and extends below the surface only a fraction of an inch the cover can be removed, if necessary, by merely filing off the top edges, thus removing the welded portions. The depth of the flange presented by the covers of my batteries is sufficient to enable five or six successive welding operations to be effected, which would be much more than would ever be necessary in the life of any cell. Since the seams to be welded in my improved batteries are the same in form for the different-size cans, it is possible to perform the welding operation thereon substantially automatically, as explained, and to facilitate the operation I find it possible to perform a welding operation on two cans simultaneously. There is of course no electrolytic action between the cover and the can, since they are both formed of the same metal, and consequently the joint obtained by welding is entirely permanent.

The objects of my invention are, first, to provide an apparatus for the purpose in which a perfect and uniform welding operation may be effected, so that the resulting joint will not only be entirely gas-tight and liquid-tight, but the appearance of the joint will be entirely satisfactory; second, to provide an apparatus wherein the arc will be automatically caused to follow the seam regardless of the form of the latter; third, to provide an apparatus in which a plurality of welding operations may be performed simultaneously on the seams of separate articles, and, finally, to provide an apparatus in which the adjustment of the carbon or carbons may be readily effected without interfering in any way with the operation of the device.

In order that the invention may be better understood, I will describe it in connection with an apparatus which has been actually installed for use in connection with the welding simultaneously of the joints of two storage-battery cans and from which its application to the welding of other objects will be understood by those skilled in the art.

Figure 12:
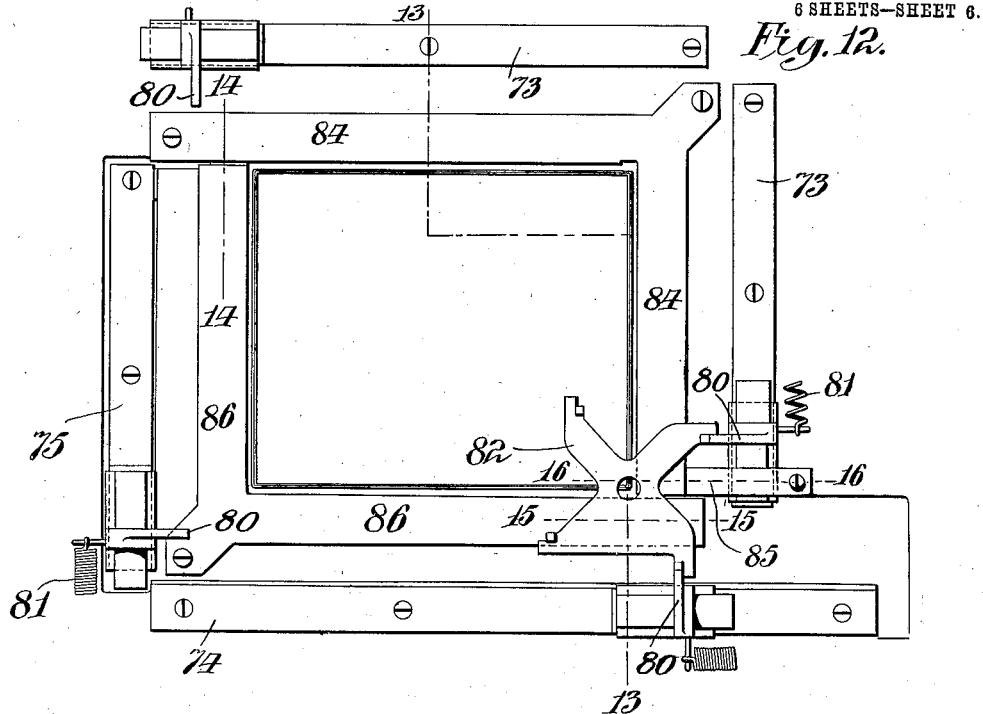
Figure 13:
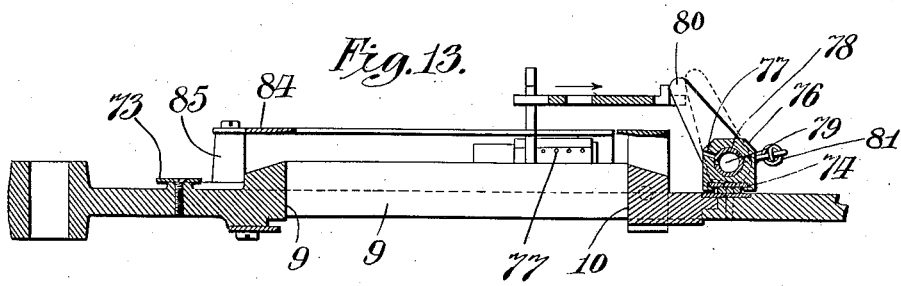
Figure 14:
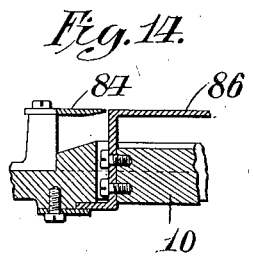
Figure 15:
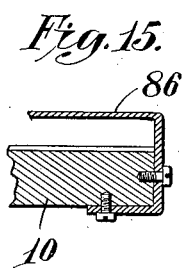
Figure 16:
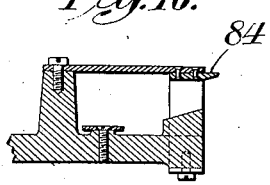

In the drawings, Figure 1 is a plan view of the apparatus; Fig. 2, a front elevation; Fig. 3, an enlarged cross-sectional view on the line 3 3 of Fig. 1; Fig. 4, a similar view on the line 4 4 of Fig. 1; Fig. 5, a similar view on the line 5 5 of Fig. 4; Fig. 6, a similar view on the line 6.6 of Fig. 4; Fig. 7, a horizontal sectional view on the line 7 7 of Fig. 4; Fig. 8, an enlarged vertical sectional view on the line 8 8 of Fig. 2; Fig. 9, a sectional view taken at right angles on the line 9 9 of Fig. 8; Fig. 10, a cross-sectional view on the line 10 10 of Fig. 8; Fig. 11, a similar view on the line 11 11 of Fig. 8; Fig. 12, a plan view showing one side of the burner-shield and burners with the can in position and illustrating also one of the burner-actuators; Fig. 13, a cross-sectional view on the line 13 13 of Fig. 12; and Figs. 14, 15, and 16 detail cross-sectional views on the lines 14 14, 15 15, and 16 16, respectively, of Fig. 12.

In all of the above views corresponding parts are represented by the same numerals of reference.

The machine is provided with a cast-metal base 1, having cut-away portions 2, through which the cans project. Each can is carried on a platen 3, having two guide-blocks 4 4, (see Fig. 3,) so that by engaging the can against these blocks it will be properly alined. Each platen is provided with a screw 5 projecting downwardly from the same, engaging which is a nut 6, supported by a bracket 7. (See Fig. 2.) These brackets are carried from the under side of the table 8, on which the base 1 is mounted. At their upper ends the cans are clamped against the fixed angular plates 84, which are secured to the standards 85, applied to the body 1, so that the inner edges of the said plates overhang the cut-away portions 2. (See Figs. 3 and 13.) The means for clamping the cans against the said plates 84 consist of angular locking-plates 86, which engage the can at its upper end. These plates 86 are rigidly secured to the angular members 10, and the latter are locked in the desired position in any suitable way. By this arrangement I readily accommodate cans varying in width, but all of the same height and length, as is the case with my improved storage battery as now manufactured. It will be understood, of course, that any other appropriate means may be employed for holding the articles rigidly in position during the welding operation. With the apparatus under description provision is made for simultaneously welding two cans, and to effect this result the two carbons are carried by a frame and are guided to follow two seams by means of a pattern corresponding with the form and size of the seam somewhat like a pantograph. This arrangement is more clearly shown in Figs. 1 to 6, inclusive. The base 1 is formed with an integral hollow box-bed 11 at its rear end, upon which is mounted a block 12 in guides, (see Fig. 6,) so as to be capable only of reciprocating movements in the same plane. A cross-arm 14 (see Figs. 1 and 6) is carried by the block 12, and pivoted to the ends of the cross-arms are two links 15 15, whose forward ends are pivoted at 16 16 (see Fig. 2) to a light skeleton bridge 17, made, preferably, of tubing, as shown. Obviously by such an arrangement the two ends of the bridge 17, at which the carbons are carried, as will be explained, will be caused to transcribe corresponding paths. The bridge carrying the carbons is caused to be properly moved, so that the carbons will follow the lines of the seams by means of a pattern of the proper form to represent the seam under process of welding. This pattern 18 (see Fig. 4) is formed with a groove 19 therein, which is the same shape and size as the seam, and engaging said groove is a small roller 20 on the lower end of the shaft 21. On this shaft is mounted a pinion 22, engaging a rack 23, extending all around the groove 19. (See Fig. 7.) The shaft 21 is mounted in a yoke 24, carried by an arm 25, whose rear end is provided with a yoke 26, pivoted on a stationary pin 27. (See Fig. 6.) Rotatably mounted on this pin is a double-grooved main driving-pulley 28, having a worm 29 engaging a worm-gear 30. This worm-gear drives a shaft 31, extending parallel with the arm 25, and at its forward end provided with a worm 32, engaging a worm-gear 33 on the shaft 21. Obviously by applying power to the main driving-pulley 28 the shaft 21 will be very slowly rotated, engaging the pinion 22 with the rack 23 and slowly moving the guide-roller 20 along the groove 19. In order to properly support the bridge 17, I provide extensions 34 at the ends, (see Figs. 1 and 2,) carrying shoes 35, which rest upon stationary tables 36. If desired, a shield 37 may be employed, carried by pedestals 38 above the pattern 18, so as to exclude dust and dirt therefrom, said shield being obviously provided with a slot corresponding with the pattern-groove 19 and in which the shaft 21 travels. The carbons are carried from the bridge 17 in any suitable way. I find, however, that the best results are secured when each carbon is rotated at a relatively high speed about its center as an axis, since by doing this the arc is more perfectly localized so as to accurately follow the seam. If, on the other hand, the carbons were not rotated, the arc would be more or less imperfect and would result in the production of an imperfect weld.

I illustrate in the drawings satisfactory mechanism for supporting, rotating, and adjusting each carbon, reference being had particularly to Figs. 8 to 11, inclusive. Here the long carbon 39 of small diameter is supported by a sleeve 40, the latter being free to move up and down in a bearing 41, formed as part of the bridge. At its lower end the sleeve 40 is split (see Fig. 9) and on its exterior is threaded, with which portion engages a cap 42, by which the sleeve will be clamped upon the carbon in a well-known manner. The carbon is rapidly rotated by a pulley 43, having a pin 44, which engages a slot 45 (see Fig. 9) in the sleeve, whereby the sleeve and carbon may be moved vertically, while at the same time they are rotated by the pulley 43. Both of the pulleys 43 are driven by a belt 46 passing around them and over an idler 47 and thence to the driving-pulley 28. The idler 47 is mounted on a block 48 (see Fig. 5) in order that it may be adjusted horizontally, so as to take up any slack in the belt 46. Referring again to the carbons, I have found that although the carbons may be adjusted automatically to maintain the arc substantially constant this cannot be done except at a sacrifice of certainty of operation and the employment of complicated devices. For these reasons I prefer to adjust the carbons manually by some such arrangement as that illustrated and which I now describe. Near its lower end the carbon-tube 40 is formed with a shoulder 49, with which engages a swivel 50, whereby the carbon-tube may be rotated independently of said swivel. Secured within the swivel 50 is a yoke 51, the two arms of which are threaded, as shown, and which engage a stationary threaded sleeve 52, which surrounds the carbon-tube and which is made fast to the bridge 17. Obviously by rotating the yoke around the stationary threaded sleeve 52 the carbon will be elevated or depressed. This is effected by employing a second yoke, whose arms 53 lie between those of the yoke 51, and which at their upper ends are connected to a pulley 54, so that by rotating the latter the yoke 51 will be rotated with respect to the threaded sleeve 52 and the two yokes will be moved relatively to each other telescopically, as will be understood. In order to rotate each of the pulleys 54 for regulating each carbon, I connect a link 55 immediately below the pulley 54 and connect said link to a second link 56, whose other end is pivoted on the shaft 57, mounted upon, but independently rotatable with respect to, the controller 58 for operating the rheostat 90 for each carbon. Carried by the shaft 57 is a small milled adjusting-wheel 59, connected with a pulley 60, over which runs a belt 61 to a pulley 62 at the joints between the links 55 and 56. The pulley 62 is connected with a second pulley 63, over which runs a belt 64 to the pulley 54, so that obviously by rotating the adjusting-wheel 59 either carbon may be raised or lowered, as may be desired. At the same time the carbon-controlling mechanism is independent of the rheostat, although the adjusting-wheel 59 is located adjacent to the controller 58, so that the operator may control either of these elements by one hand.

The entire apparatus is sufficiently compact as to enable the two adjusting-wheels 59 and controllers 58 to be readily operated by a single operator sitting in front of the apparatus and viewing the two arcs simultaneously, as I shall describe. This is done by employing a main sight-opening 65, (see Fig. 4), in which is mounted a prism 66, (see Fig. 2,) whose facets are arranged opposite openings 67 of the tubes 68. At their ends the tubes 68 are provided with enlargements 69, (see Fig. 3,) in which are mounted prisms 70. (See Fig. 2.) Leading down from the prisms 70 are sight-tubes 71, at the lower ends of which is mounted a prism or mirror 72 opposite the carbon and into which the arc is reflected. Consequently in the main sight-tube 65 the two arcs may be observed, and they may be kept in their proper position and condition by manipulating either the controller-handle 58 or the adjusting-wheel 59. Since the sighting devices are carried by the bridge, obviously the relation between each carbon and the adjacent prisms 72 does not change as the carbon follows the seam to be welded.

In practice I find that a superior welding operation is performed when the metal is independently heated, since in this way the metal flows smoothly under the heat of the arc, whereas if it is not independently heated there is a tendency of the arc to partly oxidize the metal, which sometimes results in making a poor joint. Consequently with the apparatus in its preferred form I arrange for independent heating of the metal adjacent to the seams, and I preferably construct the device so that this independent heating will progress substantially concurrently and coincidently with the travel of the arc. To do this most effectively, I prefer to make use of a separate gas-burner movable with the carbon along each side of the can or article to be welded, and each burner is automatically ignited and extinguished as it commences and ends its particular path of movement. Thus, referring particularly to Figs. 12 to 16, inclusive, I arrange guides or tracks 73, extending parallel with the stationary clamping-surfaces 9 9, and a corresponding or somewhat longer track or guide 74, (see Fig. 13,) extending parallel with one of the movable clamping-surfaces 10, so that regardless of the movements of this clamping-surface the track or guide 74 will always present the proper parallel relation thereto for carrying the burner, as will be described. Finally I employ a similar guide or track 75, which is carried with the other movable clamping-surface 10, so as to be adjustable back and forth with the same to bear the proper relation thereto at all times. These tracks 73, 74, and 75 substantially inclose the can and provide ways upon which the burners may travel to deflect the gas-flame successively on the sides of the can adjacent to the top thereof. Four of these burners are used, one mounted on each track and of any suitable character. For instance, each burner may comprise a small casing 76, (see Fig. 13,) having one or more gas-vents 77 and encircling the tubular valve 78, having a vent or vents 79 therein adapted to be brought into line with the vents 77 to permit gas to escape through the latter. Each of the valves 78 is connected to a rubber hose (not shown) for conducting gas to the same. Obviously when the parts are in the position shown in Fig. 13 gas will not escape through the vents 77; but when the valve 78 is moved radially to the position shown in Fig. 3 gas will be allowed to escape through said vent or vents. This movement of each of the valves 78 is effected by a lever 80, the parts being normally maintained in the position shown in Fig. 13 by light springs. (Not shown.) Normally each of the burners is maintained at its starting position by means of a spring 81, which will be gradually put under tension as the burner is moved along the track with the arc and which will return each burner to its starting position when released. Several burners are automatically operated by four arms 82, mounted upon the bridge 17 by supports 83. (See Fig. 3.) These arms are so proportioned as to successively engage the levers 80 of the several burners. For instance, as shown in Fig. 12, one of the arms has moved the burner at the right almost to its full extent and the next arm is just engaging the lever 80 of the succeeding burner to turn on the gas, after which the arms will be moved toward the left to thereby release the burner at the right and permit it to be returned to its normal position. One burner will be ignited from the other, because when the carbon is passing around the corner of the can gas will be turned on at the same time at the two corresponding burners. Thus as the carbon progresses around the seam it will be accompanied by the gas-flame impinging on the can in the immediate locality of the arc, tending to heat the metal at that point and facilitating the character of the welded joint, as explained, and as well reducing the work on the arc. The clamping-plates 84 and 86 act as shields under which the flame from the burners is impinged, (see Fig. 12,) whereby dissipation of the heat is largely prevented and the same is localized upon the can as much as possible.

The current is supplied to the carbons in any suitable way, care being of course taken to properly insulate the parts, so that the arc shall be properly formed between the carbons and the tops of the cans. For cutting off the current whenever desired I illustrate a switch 87, (see Fig. 2,) which may be operated by the foot.

The operation of the device will be readily understood from the foregoing description. The two cans are placed on the platens 3 3, alined by the stops 4 4 and clamped between the faces 9 and 10. Power being applied to the main driving-pulley 28, the shaft 21 will be slowly rotated to cause its lower end to follow the pattern-groove 19. This movement carries the two carbons simultaneously along the paths presented by the seams of both cans. In this movement the gas-burners will be successively carried along with the carbons, so as to locally heat the metals, as explained. The arc is formed between the carbons and the can-tops to perform the welding operation, each carbon being rapidly rotated, so as to cause the arc to accurately follow the line presented by the seam. The operator observes the two arcs through the sight-tube and properly regulates them by means of the controllers. As soon as the joint has been completely welded the circuit is broken, the cans are removed, new cans are placed in position, and the operations described are repeated.

Having now described my invention, what I claim as new therein, and desire to secure by Letters Patent, is as follows:

1. Apparatus for welding metallic articles contiguous to a seam thereon, and comprising a carbon operatively mounted in the proper relation to establish an arc between the carbon and the article, and means for rapidly rotating the carbon about its center as an axis, as and for the purposes set forth.

2. Apparatus for welding metallic articles contiguous to a seam thereon, and comprising a carbon operatively mounted in the proper relation to establish an arc between the carbon and the article, means for rotating said carbon about its center as an axis, and means for independently adjusting the carbon toward and away from the article, substantially as set forth.

3. Apparatus for welding metallic articles contiguous to a seam thereon, comprising a fixed article-support a carbon operatively mounted in the proper relation to establish an arc between the carbon and the article, and means for automatically causing the carbon to move along a closed non-circular path, as and for the purposes set forth.

4. Apparatus for welding metallic articles contiguous to a seam thereon, comprising a carbon operatively mounted in the proper relation to establish an arc between the carbon and the article, means for progressively moving the carbon with respect to the article and means for rapidly rotating the carbon about its center as an axis as it progresses, as and for the purposes set forth.

5. Apparatus for welding metallic articles contiguous to a seam thereon, comprising carbon and article supports capable of relative movement with respect to each other, a carbon mounted in its support in the proper relation to establish an arc between the carbon and the article and means for independently heating the article in advance of the arc, substantially as set forth.

6. Apparatus for welding metallic articles contiguous to a seam thereon, comprising a carbon operatively mounted in the proper relation to establish an arc between the carbon and the article, means for rapidly rotating the carbon, and means for independently heating the article in the locality of the arc, as and for the purposes set forth.

7. Apparatus for welding metallic articles contiguous to a seam thereon, comprising a carbon operatively mounted in the proper relation to establish an arc between the carbon and the article, means for automatically causing the carbon to progress along the line of the seam, and means for independently heating the article progressively with the travel of the carbon, substantially as set forth.

8. Apparatus for welding metallic articles contiguous to a seam thereon, comprising a carbon operatively mounted in the proper relation to establish an arc between the carbon and the article, means for progressing the carbon along the line of the seam, means for rapidly rotating the carbon, and means for independently heating the article progressing along the line of travel of the carbon, substantially as set forth.

9. Apparatus for welding the metal contiguous to a seam in a metallic article, comprising in combination a carbon-support, a carbon carried thereby movable along the line of the seam, and a pattern by which the support is guided to cause the carbon to follow the seam, substantially as set forth.

10. Apparatus for welding the metal contiguous to a seam in a metallic article, comprising in combination a carbon-support, a carbon carried thereby movable along the line of the seam, a pattern by which the support is guided to cause the carbon to follow the seam, and means for automatically moving the support along the line of the pattern to cause the carbon to follow the line of the seam, substantially as set forth.

11. Apparatus for welding the metal contiguous to a seam in a metallic article, comprising in combination a carbon-support, a carbon carried thereby movable along the line of the seam, a pattern by which the support is guided to cause the carbon to follow the seam, and means for rotating the carbon during its travel, substantially as set forth.

12. Apparatus for welding the metal contiguous to a seam in a metallic article, comprising in combination a carbon-support, a carbon carried thereby movable along the line of the seam, a pattern with which the support engages, means for automatically moving the support along the line of the pattern to cause the carbon to follow the line of the seam, and means for rotating the carbon during its travel, substantially as set forth.

13. Apparatus for simultaneously welding the metal contiguous to the seams of a plurality of metallic objects, comprising supports for the objects, a plurality of carbons mounted in the proper relation to the objects to establish an arc between each carbon and the adjacent object, a common support for the carbons and means for moving the support, whereby the carbons will simultaneously progress along the line of the seams presented by the several objects, substantially as set forth.

14. Apparatus for simultaneously welding the metal contiguous to the seams of a plurality of metallic objects, comprising supports for the objects, a plurality of carbons mounted in the proper relation to the objects to establish an arc between each carbon and the adjacent object, a common support for the carbons and means for automatically moving the carbon-support, so as to cause the carbons to progress along the line of the seams, substantially as set forth.

15. Apparatus for simultaneously welding the metal contiguous to the seams of a plurality of metallic objects, comprising supports for the objects, a plurality of carbons mounted in the proper relation to the objects to establish an arc between each carbon and the adjacent object, a common support for the carbons and means for simultaneously rotating the carbons about their centers as axes, substantially as set forth.

16. Apparatus for simultaneously welding the metal contiguous to the seams of a plurality of metallic objects, comprising supports for the objects, a plurality of carbons mounted in the proper relation to the objects to establish an arc between each carbon and the adjacent object, a common support for the carbons, means for automatically moving the carbon-support so as to cause the carbons to progress along the line of the seams, and means for simultaneously rotating the carbons, substantially as set forth.

17. Apparatus for the purpose described, comprising in combination, a bridge or support, pantographic connections for simultaneously causing the ends of the bridge to follow the same paths, a carbon mounted at each end of the bridge, and a pattern by which the bridge is guided, substantially as described.

18. Apparatus for the purpose described, comprising in combination a bridge or support, pantographic connections for simultaneously causing the ends of the bridge to follow the same paths, a carbon mounted at each end of the bridge and a pattern by which the bridge is guided, and means for simultaneously rotating the two carbons, substantially as set forth.

19. Apparatus for the purpose described, comprising in combination a bridge or support, pantographic connections for simultaneously causing the ends of the bridge to follow the same paths, a carbon mounted at each end of the bridge, a pattern by which the bridge is guided, and means for independently adjusting the two carbons, substantially as set forth.

20. Apparatus for the purpose described, comprising in combination a bridge or support, pantographic connections for simultaneously moving its two ends in the same paths, a carbon at each end of the bridge or support, a pattern, a rack surrounding the pattern, and a pinion carried by the bridge and engaging the said rack whereby the bridge is caused to follow the line of the pattern, substantially as set forth.

21. Apparatus for the purpose described, comprising in combination a bridge or support, a shoe carried by the bridge or support on each end, a fixed table with which each shoe engages for supporting the bridge, pantographic connections with the bridge, and two carbons carried by the bridge, substantially as set forth.

22. Apparatus for the purpose described, comprising in combination a bridge or support, a pair of carbons carried at the ends of the bridge or support, and means for simultaneously observing the arcs formed by the two carbons, as and for the purposes set forth.

23. Apparatus for the purpose described, comprising in combination a bridge or support, a pair of carbons at the end of the bridge or support, and a sighting device leading from the center of the bridge or support to points adjacent to the carbons whereby the arcs formed thereby may be simultaneously observed, substantially as set forth.

24. Apparatus for the purpose described, comprising in combination a bridge or support, a pair of carbons at the end of the bridge or support, a sighting device leading from the center of the bridge or support to points adjacent to the carbons whereby the arcs formed thereby may be simultaneously observed, and means for independently regulating the carbons, substantially as set forth.

25. In apparatus for welding the metal contiguous to the seam of metallic articles, the combination with the carbon arranged in the proper relation with the article to establish an arc between the carbon and the article, and a gas-burner movable with the carbon to heat the metal contiguous to the arc, substantially as set forth.

26. In apparatus for welding the metal contiguous to the seam of metallic articles, the combination with the carbon arranged in proper relation with the article to establish an arc between the carbon and the article, a gas-burner movable with the carbon to heat the metal contiguous to the arc, and a shield under which the burner travels, substantially as described.

27. Apparatus for welding the metal contiguous to the seam of a hollow metallic article, comprising a series of gas-burners movable successively along the sides of the articles, and a carbon movable along the line of the seam, and arranged to engage the burners to cause them to follow the carbon, whereby the metal of the article will be heated locally as the arc progresses along the seam, substantially as set forth.

28. Apparatus for welding the metal contiguous to the seam of a hollow metallic article, comprising a series of gas-burners movable successively along the sides of the articles, a carbon movable along the line of the seam and arranged to engage the burners to cause them to follow the carbon, whereby the metal of the article will be heated locally as the arc progresses along the seam, the connections being such that when the actuating devices engage each burner successively, the gas will be turned on within the same, substantially as set forth.

29. In an apparatus for the purpose described, the combination with the carbon movable along the seam, of a burner movable parallel to the seam, a connection between the carbon and the burner whereby the burner will be moved with the carbon, and means for releasing the burner to return it to its normal position, substantially as set forth.

30. In an apparatus for the purpose described, the combination with the carbon movable along the seam, of a burner movable parallel to the seam, a connection between the carbon and the burner, whereby the burner will be moved with the carbon, means for releasing the burner to return it to its normal position, and means for opening the burner prior to its movement with the carbon, substantially as set forth.

31. In an electric welding apparatus, the combination of carbon and article supports capable of relative movement with respect to each other, a carbon mounted in its support in the proper relation to maintain an arc between the carbon and article, and means for rotating the carbon about its center as an axis, substantially as set forth.

32. In an electric welding apparatus, the combination of carbon and article supports capable of relative movement with respect to each other, a carbon mounted in its support in the proper relation to maintain an arc between the carbon and article, and means for moving one of said supports in a closed, non-circular path, substantially as set forth.

33. In an electric welding apparatus, the combination of carbon and article supports capable of relative movement with respect to each other, a plurality of carbons mounted in proper relation to maintain an arc between each carbon and the article upon which it operates, a rheostat for regulating the strength of each arc, and means adjacent each rheostat-controller for varying the length of the arc controlled thereby, substantially as set forth.

34. In an electric welding apparatus, the combination of carbon and article supports capable of relative movement with respect to each other, a plurality of carbons, and a sighting device comprising tubes leading from a point opposite each carbon to a common center, substantially as set forth.

This specification signed and witnessed this 12th day of July, 1904.

THOS. A. EDISON

Witnesses:
FRANK L. DYER,
ANNA R. KLEHM.